United States Patent [19]
Darredeau et al.

[11] Patent Number: 5,666,825
[45] Date of Patent: Sep. 16, 1997

[54] PROCESS AND INSTALLATION FOR THE SEPARATION OF AIR

[75] Inventors: Bernard Darredeau, Sartrouville; Jean-Yves Lehman, Maisons-Alfort; Jean-Marc Peyron, Creteil, all of France

[73] Assignee: L'Air Liquide, Societe Anonyme pour l'Etude et l'Exploitation Des Procedes Georges Claude, Paris, France

[21] Appl. No.: 708,013

[22] Filed: Aug. 30, 1996

Related U.S. Application Data

[60] Continuation of Ser. No. 509,137, Jul. 31, 1995, Pat. No. 5,592,834, which is a division of Ser. No. 230,521, Apr. 20, 1994, Pat. No. 5,437,160.

[30] Foreign Application Priority Data

Apr. 29, 1993 [FR] France .................................. 93 05062
Sep. 28, 1993 [FR] France .................................. 93 11509

[51] Int. Cl.⁶ .................................................. F25J 3/04
[52] U.S. Cl. .......................................................... 62/656
[58] Field of Search ................................ 62/646, 650, 654

[56] References Cited

U.S. PATENT DOCUMENTS 4,566,887  1/1986  Openshaw .
5,152,149  10/1992  Mostello et al. .

Primary Examiner—Christopher Kilner
Attorney, Agent, or Firm—Robert Tousler

[57] ABSTRACT

A process and installation for the separation of air in a cryogenic distillation apparatus (24) comprising a distillation column (30, 42) and in which the supplied air is separated to produce a fraction rich in oxygen and a fraction rich in nitrogen as products. The purities of these products are maintained substantially constant during variations of demand of either product or of the flow rate or of the pressure of the supplied air by introducing an excess of liquid rich in nitrogen into the distillation apparatus when the demand for the product or the flow rate of the supplied air increases, and by withdrawing an excess of liquid rich in nitrogen from the distillation apparatus, and storing this liquid, when the demand for the product or the flow rate of the supplied air decreases. The apparatus comprises a medium pressure column (30) and a low pressure column (42) and a reflux conduit (44; 11, 12) which permits a reflux liquid to be withdrawn from the medium pressure column (30) and to be injected into the low pressure column (42).

2 Claims, 6 Drawing Sheets

PROCESS AND INSTALLATION FOR THE SEPARATION OF AIR

This is a continuation of application Ser. No. 08/509,137, filed Jul. 31, 1995, now U.S. Pat. No. 5,592,834, Issued Jan. 14, 1997 which is a divisional of application Ser. No. 08/230,521, filed Apr. 20, 1994, now U.S. Pat. No. 5,437,160, Issued Aug. 1, 1995.

The present invention relates to the technique of air separation in a distillation column.

There has arisen in recent years a demand for rapid variations in operation of apparatus for air separation (ASU). In particular, this requirement is present in the technique for air separation in a distillation column in which the oxygen produced is utilized in an electrical central unit of the type IGCC (Integrated Gasifier Combined Cycle).

In central electric units of this type, recently developed, the electricity is produced from coal and oxygen. Because of the variable demand for electricity by the customers, it is necessary that the oxygen supply also follows this variable demand and that the purity of the oxygen be constant (typically greater than 80% for use in the gasifier).

In the case in which the air separation unit is associated with said central unit of the IGCC type (FIG. 1), the air from the ASU which goes to the compressor 2 coupled mechanically to a gas turbine 4, has its flow rate and its pressure variable. Thus, the rapid variation of the demand for electricity, coupled with that for the oxygen sent to the IGCC, gives rise to a variation in the combustible gases produced in the gasifier 6 and a variation of the combustion gases. There results a rapid variation of the flow rate and pressure of the compressed air in the compressor 2 and, as a result, of the flow rate and of the pressure of the air sent to the ASU.

The problem is therefore to permit the ASU to produce oxygen in a variable quantity which will however be sufficient to satisfy the variable demand for electricity, while maintaining a constant purity to satisfy the criteria of the gasifier 6 of the IGCC, despite fluctuations of flow rate resulting from this variation of demand for electricity for an integrated ASU. Simultaneously, the residual nitrogen being sent after compression to the gas turbine 4, it is necessary to maintain the oxygen content of this nitrogen below certain limits. It therefore is necessary to maintain the purity of all the products of the distillation.

When the air compressor 8 of the ASU is independent of the compressor 2 of the gas turbine 4 (FIG. 2), the problem for the ASU is to supply a suitable flow rate of oxygen sent to the gasifier 6, by rapidly adjusting to the demand of this latter. In this case, the flow rate of the air compressor 8 varies approximately as the flow rate of oxygen and its output pressure varies relatively little.

The object of the invention is to provide a solution which responds to these two problems.

A solution to the problem posed by the pressure variation of the air and of the distillation column is suggested by the patent application EP-A-0 519 688, comprising the injection of liquid nitrogen into the column, when the pressure decreases, and withdrawal and storage of liquid nitrogen in the opposite case. This solution is adapted to compensate the following phenomena:

the generation of flash gas in large quantity when the quantity of liquid contained in the column (inventory or "hold-up") is great and when the pressure falls, the flash gas generated is rich in oxygen and renders the production of pure nitrogen difficult.

On the other hand, the process according to EP-A-0 519 688 does not correct the deciding factor which takes place in distillation columns during a change of operation. This is the variation of liquid inventory located in the columns. This inventory is greatly reduced when the liquid flow rates are reduced, which is to say when the flow of air treated in the ASU is reduced. There is then an excess of liquid which must be removed if it is not desired to find all the liquid in the bottom of the columns and to experience a loss of purity of the products withdrawn at this point (particularly oxygen).

The invention has for its object to provide a solution which can respond to the problem posed by rapid change of the flow rate of air in distillation columns (with packing or plates).

Thus, the columns are so constructed that when the flow rate of air is rapidly changed, the inventory varies in a greater way as much from this variation as from the fact of production of flash gas or its recondensation during pressure variation. Unexpectedly, despite the size of the liquid volumes in distillation columns, which gives rise to important vaporization in the case of a pressure drop for example, the variation of these volumes, because of the variation of the flow rate, is even greater such that it is necessary, to maintain the product contents, to reduce the liquid nitrogen reflux in the case of a drop of the air flow rate and to augment this reflux in the case of increase in air flow rate.

The applicant has therefore discovered, surprisingly, that it is necessary to do exactly the reverse of what is described in the patent EP-A-0 519 688 in the case of changing the flow rate of air for a distillation column comprising perforated plates or structured packing.

To this end, the invention has for its object a process for the separation of air in a cryogenic distillation apparatus comprising at least one distillation column in which the supplied air is separated to produce a fraction rich in oxygen and a fraction rich in nitrogen as products, characterized in that the purities of these products are maintained substantially constant during variations of demand for the product or the flow rate or the pressure of the supply air, by a) introducing an excess of liquid rich in nitrogen into the distillation apparatus if the demand for product or if the supply air flow rate increases, or b) withdrawing an excess of liquid rich in nitrogen from the distillation apparatus, if the demand for product or the supply air flow rate decreases.

The invention also has for its object an installation for the separation of air in a cryogenic distillation apparatus comprising at least one distillation column in which the supplied air is separated to produce a fraction rich in oxygen and a fraction rich in nitrogen as products, characterized in that it comprises means to ensure the constant purity of these products during variations in demand for the product or the flow rate or the pressure of the supply air, these means comprising a) means to introduce an excess of liquid rich in nitrogen into the apparatus if the demand for product or the flow rate of the supplied air increases, and b) means to withdraw an excess of liquid rich in nitrogen from the apparatus, while storing this liquid, if the demand for product or the flow rate of the supplied air decreases.

Moreover, it has for its object an installation for the separation of air in a cryogenic distillation apparatus comprising a distillation column, in which the supplied air is separated to produce a fraction rich in oxygen and a fraction rich in nitrogen, comprising means to ensure the constant purities of these products during variations of demand for this product or of the flow rate or of the pressure of the supply air, these means comprising means to introduce and to withdraw a liquid rich in nitrogen from the apparatus and means for storing this liquid, characterized in that the storage means are located in a low pressure column of the distillation column.

The applicant has discovered a phenomenon which is quite surprising: when production is reduced and, as a result, the flow rates of gas and liquid treated in at least one column, it is noted that the comportment of this column or these columns is such that it is no longer necessary to inject liquid nitrogen but on the contrary, to withdraw liquid nitrogen in the case of reduction of the operation and of the pressure and injecting the same in the case of increase of load (and pressure).

The explanation is as follows: when the load and the liquid and gas flow rates are reduced in the column (and the pressure), there are produced two phenomena of opposite directions.

The first phenomenon, connected to the reduction of pressure, is a flashing of the liquid contained in the column. The quantity of flash gas generated is a function of the pressure drop and the quantity of liquid contained in the column.

The second phenomenon is the change in liquid inventory in the column which results from the variation of the flow rates of the gas and liquid treated.

However, surprisingly and contrary to that which was generally believed until now, it has been discovered that the second phenomenon is preponderant, even in a column having substantially perforated plates, when the pressure varies substantially proportionally to the air flow rate and, a fortiori, when it varies by proportions less than the flow rate of air (which is generally the case). The reduction of liquid inventory, when the load is reduced, translates in a plate column into an excess of liquid situated on each plate (and in a packed column, by an excess of liquid situated in each distributor) which must be evacuated if it is desired to avoid having an excess of reflux and an accumulation of liquid in the base of the column with a loss of purity of oxygen because, simultaneously, the heating in the base of the LP column by condensation of nitrogen, is reduced.

The altogether surprising discovery that the applicant has made when studying the behavior of perforated plate and packed columns during rapid change of operation is therefore, not only that they permit avoiding loss of purity of the nitrogen in the course of the phase change, but that they require, to maintain the purity of the oxygen, providing a withdrawal of liquid nitrogen, when the production and pressure are reduced, and an injection of liquid nitrogen when the productions are to be increased, so as to supply the plates (or in a packed column, the distributor at the top of the column) to maintain at all times a sufficient reflux by restoring the inventory sufficiently quickly.

Another improvement of the response of the apparatus during changes in operation is brought about by the following arrangements: the essential problem of adjustment during the transition phase is to control the gaseous flow rates rising in the column to maintain the purities at the two ends (oxygen and nitrogen). However, maintaining these two purities could become incompatible in a transitory situation. It is therefore quite interesting to be able to render relatively independent, during the transitory phase, the adjustment of the purity of the oxygen and that of the nitrogen. If the distillation column comprises an LP column and an MP column, the conditions of distillation are greatly improved in the upper portion of the LP column when the flow rate of the intake turbine is reduced. (in the case in which air is turbined which supplies the LP column). An improvement of the control of the ASU when changing operation is therefore to reduce during the transitory phase the flow rate of the intake turbine below that which it would have at equilibrium at each moment, thereby permitting improving the purities of the oxygen and of the nitrogen at the same time, therefore controlling them better. The same thing can be done with a turbine expanding the MP nitrogen, in the case in which the decrease of MP nitrogen thus expanded is used to supply supplementary reflux and therefore to improve the distillation in the MP column, and as a result in the LP column.

Finally, if the process comprises a distillation support cycle, the flow rate of this cycle can be increased in a transitory period or the flow rate of the turbine associated with the cycle as the case may be can be reduced.

Various examples of embodiment of the invention will now be described, with reference to the accompanying drawings, in which.

Figure 1:
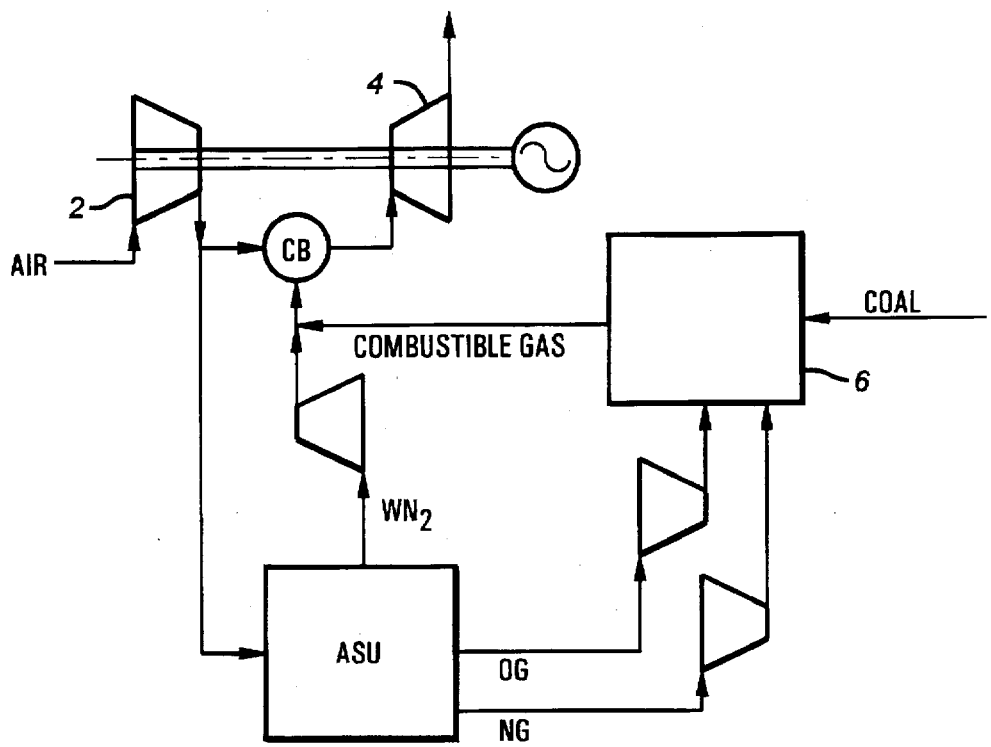
FIGS. 1 and 2 show IGCC systems.
Figure 2:
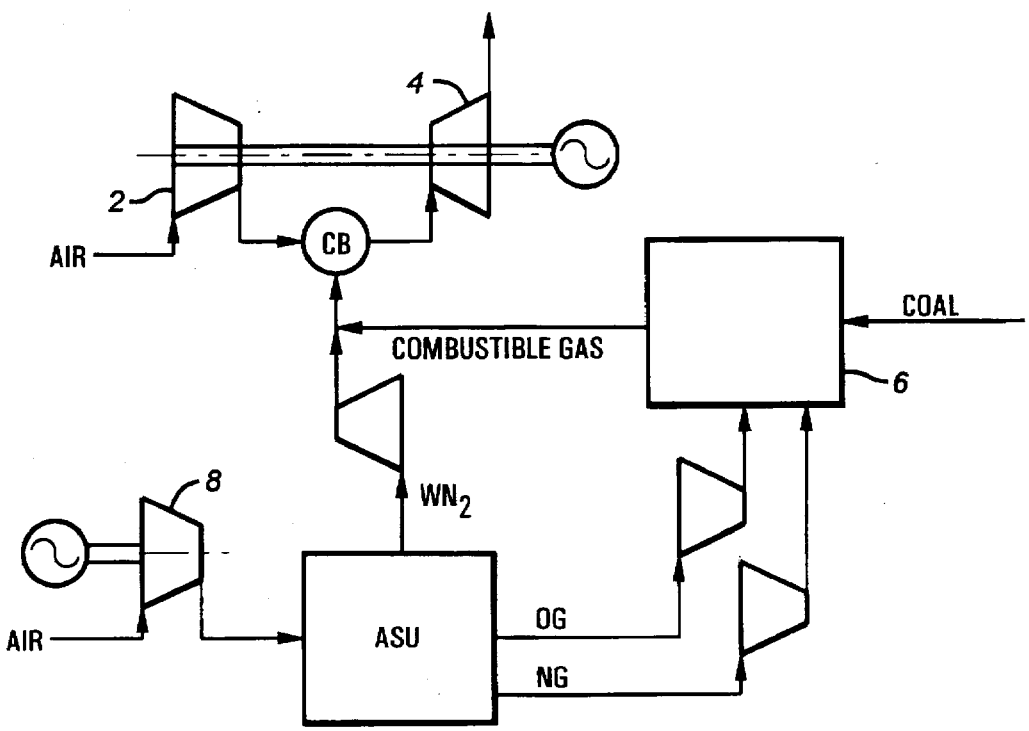
Figure 3:
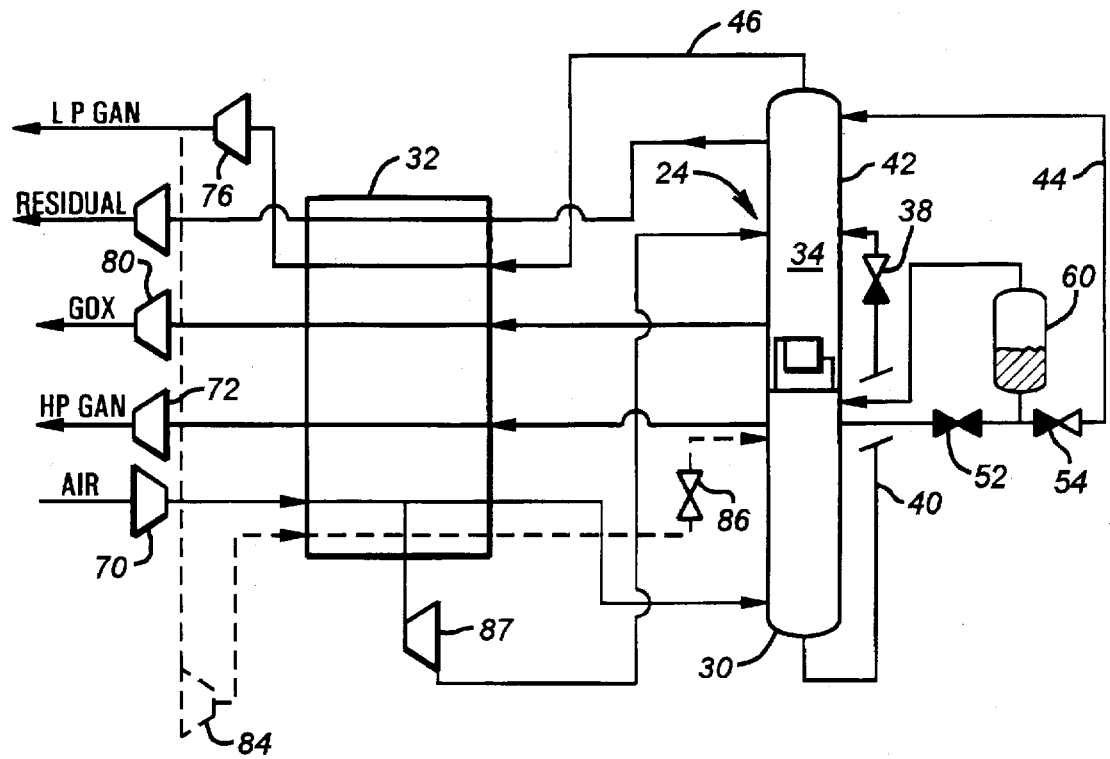
FIG. 3 shows a diagram of two embodiments of an installation according to the invention.
Figure 5:
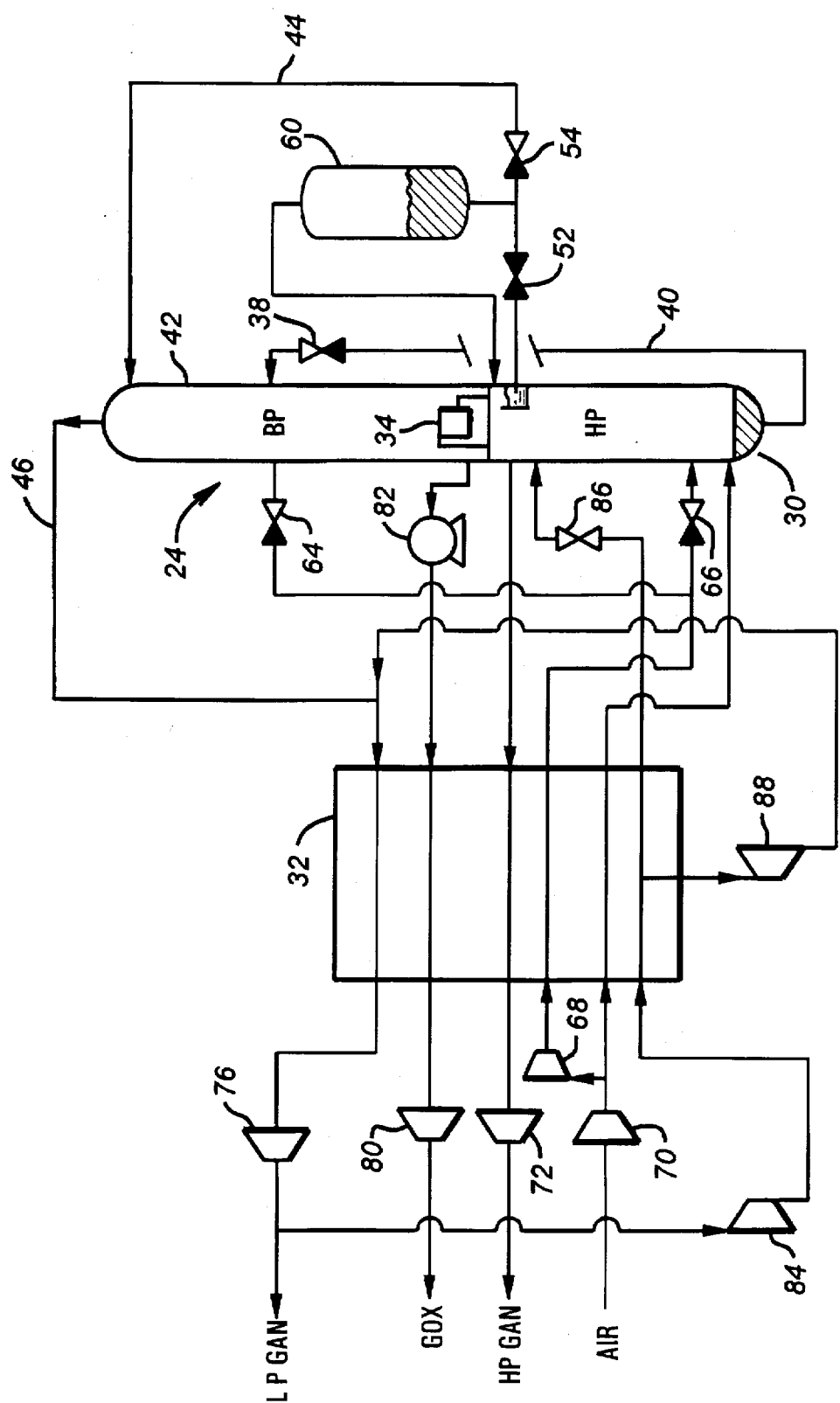
Figure 7:
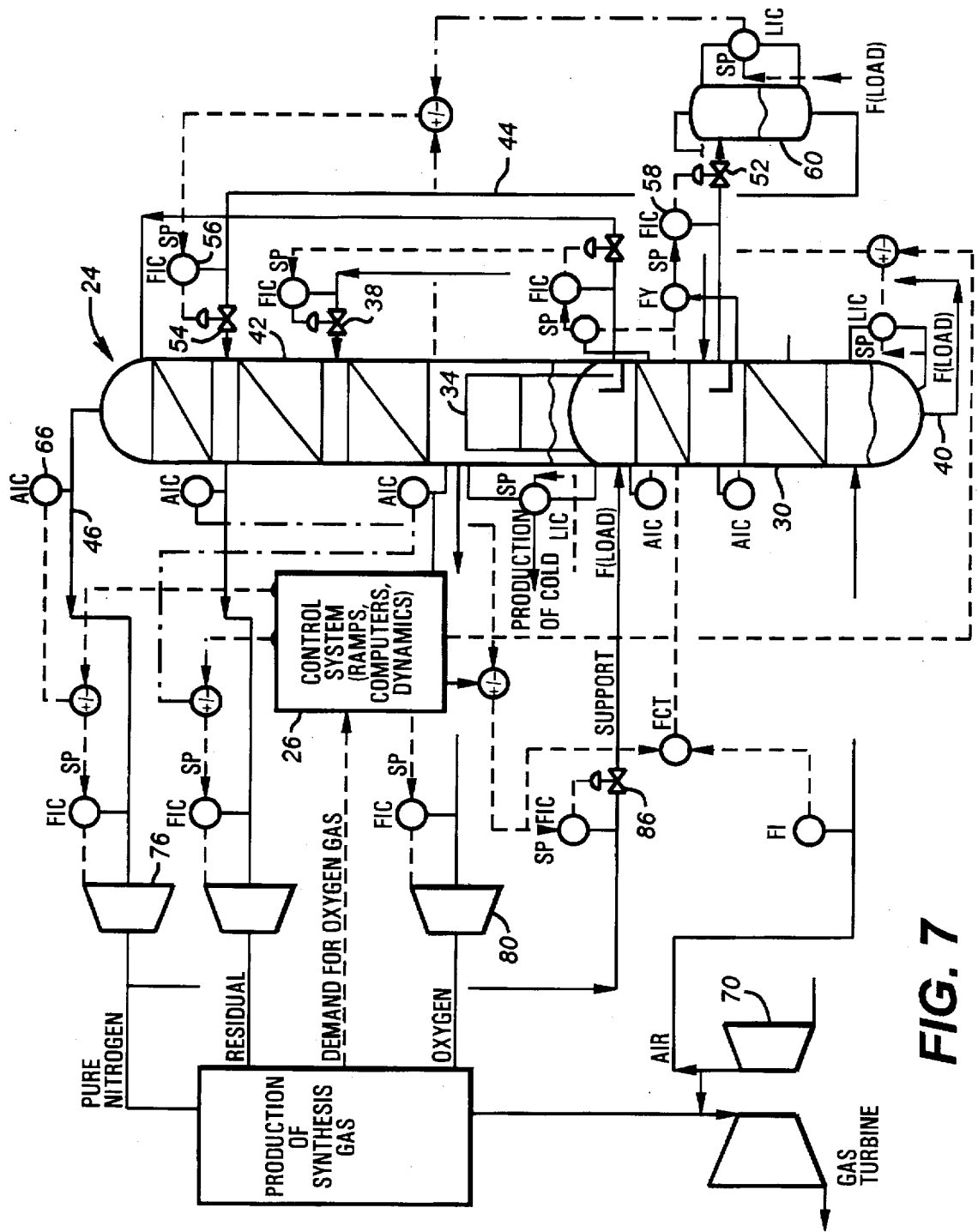
Figure 8:
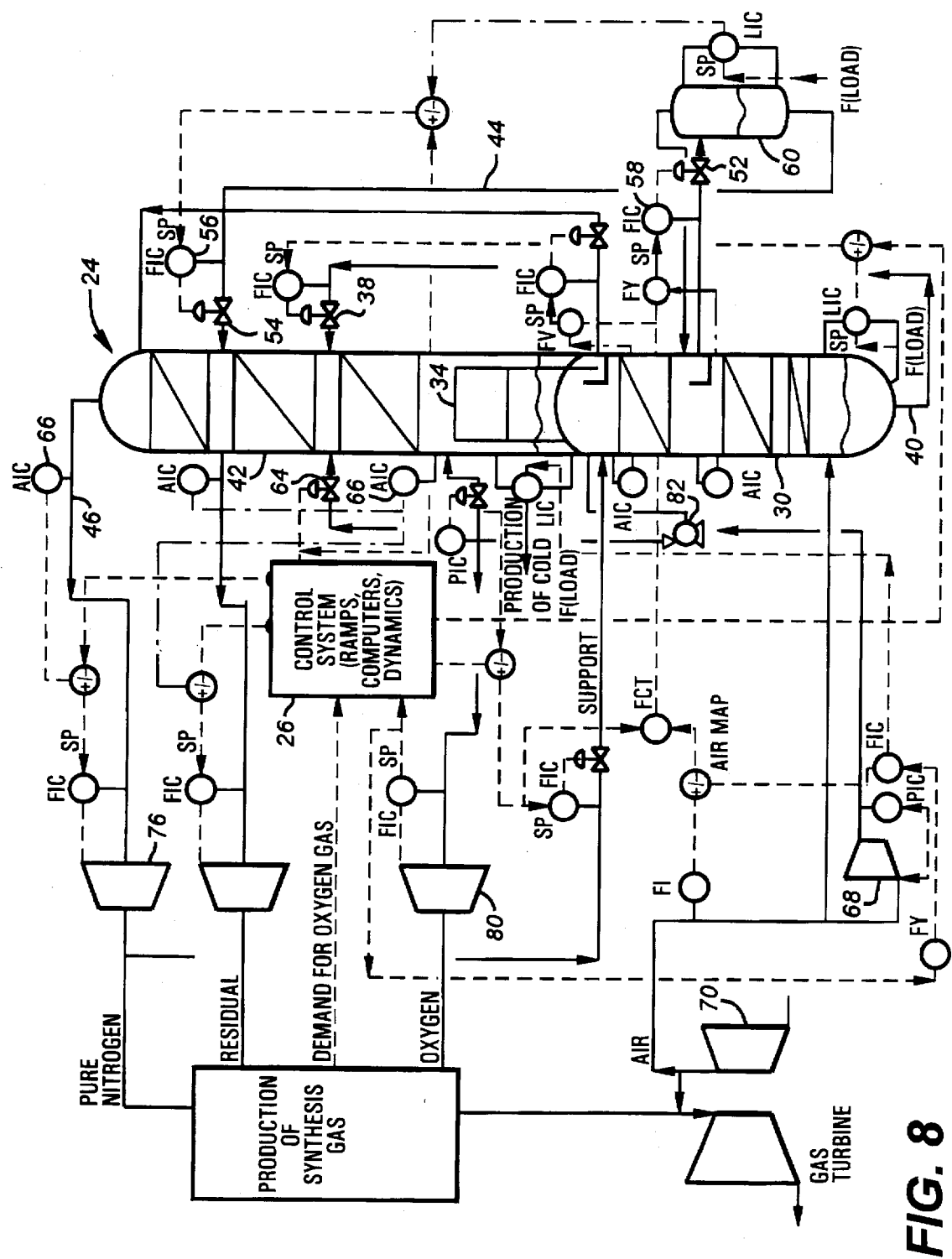

FIGS. 7 and 8 respectively show diagrams of FIGS. 3 and 5, respectively, illustrating the regulation means.

In FIG. 3, the air is compressed in a compressor 70 and cooled in a heat exchanger 32. The cooled air is introduced into the base of the medium pressure column (MP) 30 of a double distillation column 24. Column 24 is provided with perforated plates. However, the plates could be at least partially replaced by packing (structured or bulk).

In MP column 30, the air is separated to a nitrogen gas and a bottoms liquid enriched in oxygen. A portion of the vapor phases to a condenser 34 in the low pressure column (LP) where it is condensed and returned as reflux to MP column 30. The high pressure nitrogen is withdrawn from the MP column and the other portion is reheated in exchanger 32 then compressed by a compressor 72. The bottoms liquid enriched in oxygen is withdrawn from MP column 30 and injected into LP column 42, through the line 40.

To produce reflux for the LP column 42, liquid nitrogen is withdrawn from the upper portion of MP column 30, via line 44, and is injected into the head of LP column 42. The reflux liquid nitrogen, of line 44, and the base liquid, of line 40, are distilled to produce low pressure gaseous nitrogen (LP GAN) and liquid oxygen.

When the oxygen demand is constant, the pressure in the column 24 is maintained thanks to control means for the flow rate of oxygen and nitrogen withdrawn from column 24. All the nitrogen which circulates in the reflux conduit is sent as reflux to column 42. Nothing is stored in tank 60; the valves 52, 54 upstream and downstream of the tank 60 control the flow rates which are introduced into and withdrawn from it.

When the demand for oxygen is reduced, the quantity of liquid in the column 24 decreases and, as a result, an excess of liquid rich in nitrogen must be withdrawn to avoid an excess of reflux. This liquid is transferred from the column 24 to the tank 60 thanks to a reduction in flow rate through the conduit 44. At the same time, there is withdrawn less nitrogen via the conduit 46.

When the demand for oxygen increases, to maintain sufficient reflux in the apparatus, the flow rate from the conduit 44 is increased with the valve 54 and an excess of liquid nitrogen is injected.

Figure 4:
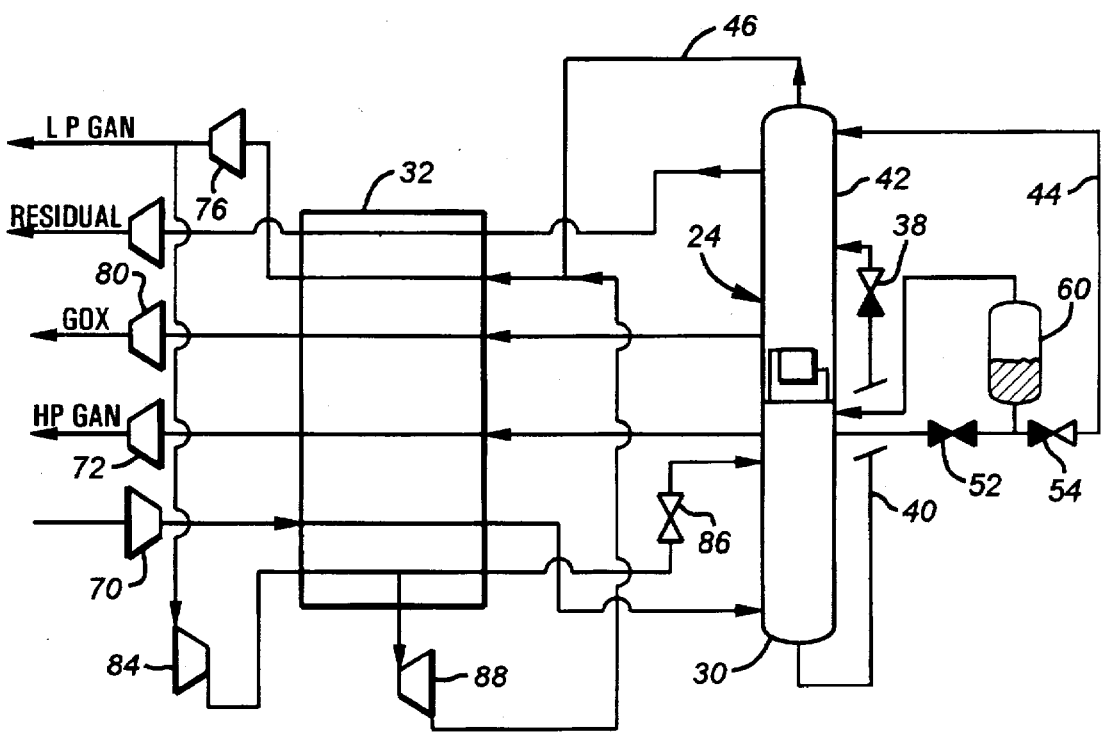
FIGS. 4 and 5 show diagrams of other embodiments of an installation according to the invention.

FIGS. 3, 4 and 5 show four modifications, which can moreover be combined, adapted to ensure the purity of the gaseous products.

In FIG. 3, a portion of the supply air compressed by the compressor 70 is expanded by an expansion turbine 88 and then introduced into the low pressure column 42.

There is represented in dotted lines in FIG. 3 a support cycle: here, a portion of the nitrogen compressed by the compressor 76 is compressed by another compressor 84, before introduction into the head of the medium pressure column 30, so as to serve to support the rectification. The gas returned to the MP column 30 permits withdrawing more liquid from the head of MP column 30 to the LP column 42 thus improving the quantity of reflux of the LP column 42 and hence its distillation capacity.

This rectification support is useful also during variations of loading of the apparatus. In the case of increased demand for gaseous oxygen, the rectification support is augmented in advance and therefore more rapidly than the load of the apparatus, correspondingly extending the limits of detachment of the purities. In the case of reduction, the support is diminished more slowly than the loading of the apparatus.

A support cycle is also illustrated in FIG. 4: here, a portion of the nitrogen of the support cycle is expanded by an expansion turbine 88 after partial cooling and recycled after heating in the compressor 76.

In FIG. 5, the installation illustrated is a modification of that of FIG. 4. A portion of the air compressed by the compressor 70 is further compressed in the compressor 68 before being cooled in the exchanger 32. This twice compressed portion is divided into two fractions in liquid phase, of which one is introduced into the MP column 30 and of which the other is introduced into the LP column 42.

Oxygen is withdrawn in liquid phase from the base of LP column 42 and passed to the exchanger 32 after compression by a pump 82 and is vaporized countercurrent with compressed air.

Upon a reduction in oxygen demand, and a reduction of the pressure of the air, the flow rate of compressed and liquefied oxygen in the heat exchange line 32 is reduced more slowly than the flow rate of liquid rich in oxygen which is vaporized in the heat exchange line, such that the excess of compressed air flow rate absorbs at least in part the excess of refrigeration supplied by the disequilibrium between the flow rates of gas undergoing heating and gas undergoing cooling in the heat exchange line during this phase.

Upon an increase in oxygen demand, and an increase of the air pressure, the flow rate of compressed and liquefied air is increased less quickly than the flow rate of liquid rich in oxygen which is vaporized in the heat exchange line, to compensate the thermal disequilibrium which occurs in the heat exchange line during this phase resulting from the disequilibrium of the flow rate between the products undergoing heating and the products undergoing cooling in this latter.

The compressed air flow rate permits counterbalancing a disequilibrium of the heat exchange line 32 in the transition phases by modulating the total heat flow.

In case of a decrease in load, the compressed air flow will be maintained greater than the normal ratio of the flow rate of oxygen to the flow rate of compressed air. In case of increase of the load, the opposite will be done.

Figure 6:
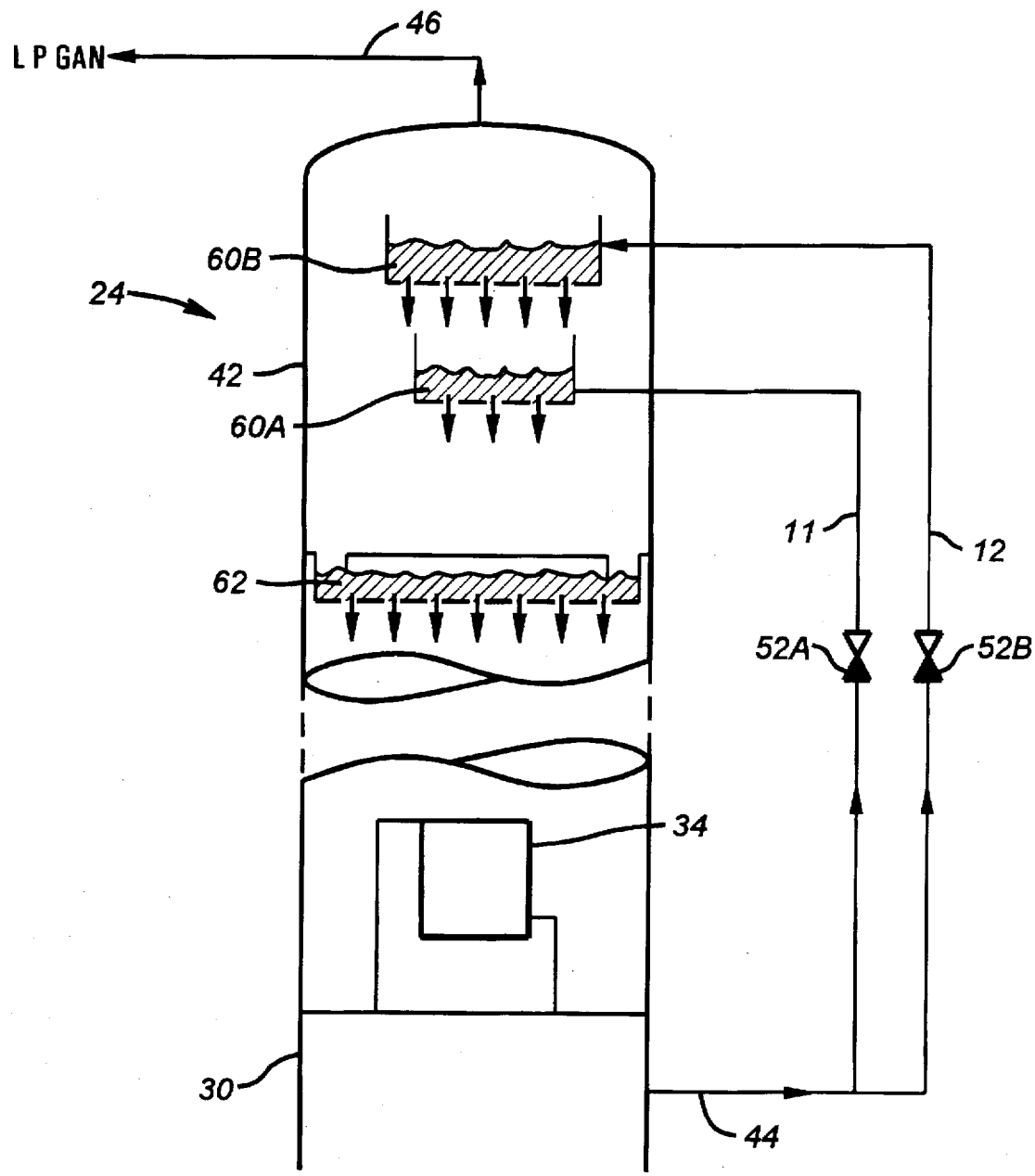
FIG. 6 shows a storage means according to the invention.

As a modification, the tank 60 could be replaced by a reservoir in the LP column 42 above the head distributor in a packed column (structured or bulk) illustrated in FIG. 6. The reservoir 60B is dimensioned to let pass 50% of the nominal flow rate. Under these conditions, the volume of liquid which it contains is equivalent to the volume of liquid which is desired to be stored. The two reservoirs 60A, 60B are connected by conduits 11, 12 to the respective valves 52A, 52B, themselves connected to the head of the MP column 30 by two conduits.

The arrangement (O, F/open, closed) of the valves 52A, 52B, respectively, supplies 100% of the control. The arrangement (F, O) supplies only the reservoir 60B and furnishes 50% of the control. The opening to a greater or lesser extent of the valves 52A, 52B supplies control intermediate these two limits of operation.

Those skilled in the art will note that this modification is a means for storage which is suitable for various distillation processes and for other types of installations than those shown in FIGS. 3 to 5. It permits storing the liquid rich in nitrogen at low pressure.

Although, in FIGS. 3 to 5, the distillation column 24 is provided with a principal film evaporator 34, those skilled in the art will understand that this evaporator is not an essential element of the invention and can be replaced by other devices.

FIGS. 7 and 8 show in great detail the means for control of the installations of FIGS. 3 (comprising the characteristics shown in dotted lines), and 5, respectively.

The control means comprise regulation elements known per se such as FIC ("flow controllers") 56, 58, to control the flow rates, AIC ("Analysis controllers") 66 and a computer 26 which connects all of the other elements and controls their functions.

In steady-state operation, the flow rates leaving the apparatus (residue, gaseous oxygen and gaseous nitrogen) define by material balance the flow rate of air entering the unit.

In the case of an increase in load requirement, it suffices to increase the gaseous flow rates leaving the LP column 42 to admit more air flow into the MP column 30. Thus, the pressure of the LP column 42 falls, increasing the mean temperature difference of the vaporizer/condenser and therefore its condensation capacity (the flow rate of air required in the MP column 30 increases).

In the case of a decrease in load requirement, it suffices to decrease the gaseous flow rates leaving the LP column 42 to admit less air into the MP column 30. The air flow rate admitted increases or decreases of itself to the value necessary for the production of oxygen required at the necessary purity.

The liquid entering the tank 60 from the withdrawal of poor liquid from the MP column 30 is regulated by an FIC (flow controller) 58 acting on the valve 52 for sending the liquid to the tank 60. Its regulation point is a linear function of the air flow rate entering the MP column 30, filtered by a dynamic function taking account of the delays and of the type of dynamic compensation (time delay, lead-lag, ramp . . . ) permitting controlling the retained liquid in the MP column 30.

The liquid leaving the tank 60 toward the inlet of poor liquid into the LP column 42 is adjusted by an FIC 56 acting on the valve 54 for sending liquid toward the LP column 42. Its regulation point is a dynamic function taking account of the flow rate of air calculated from the gaseous oxygen demand treated by a battery and a function of dynamic compensation permitting controlling the liquid retention of a section of LP column 42 located between the poor liquid inlet and the rich liquid inlet.

In a transitional phase, the two FIC's 56, 58 having regulation points controlled by different dynamics, the tank 60 fills or empties during decrease or increase of the operation, respectively.

Under steady-state conditions, FIC 56 for the exiting flow rate is subject to regulation of the level of tank 60; its control point is of course adjusted as a function of the load of the apparatus. The regulation point of FIC 58 installed in the liquid entering the tank 60 is corrected by the outlet of the regulator of the purity of the nitrogen withdrawn from the head of MP column 30.

The flash generated by the pressure variations of the columns induces temporary disequilibrium in the heat exchange line.

In case of a decrease in load, the cold producing flow rate is greater than the opposite; upon increasing the load, it is the reverse.

Under steady-state conditions, the purity of the gaseous oxygen is a result of the ratio of the oxygen flow rate to the air flow rate. As a result, for a given flow rate of gaseous oxygen, the improvement of oxygen purity takes place while increasing the flow rate of air, hence by augmenting the residual flow rate relative to the gaseous oxygen flow rate.

For a given LP column 42 and a given flow rate of oxygen, the purity of the residue is a result. If rectification support is available, this permits increasing the distillation capacity of the LP column 42 and hence the relative adjustment of the oxygen and residual purities.

Under steady-state conditions, an AIC 66 whose measurement is the oxygen content in the residue will correct the adjustment of the support flow rate.

This invention is applicable equally to apparatus comprising a distillation column including packing or bulk structures or perforated plates. An apparatus according to the invention can also comprise a combination of packing and perforated plates.

What is claimed is:

1. A process for the separation of air in a cryogenic distillation apparatus comprising a distillation column and in which air is separated to produce a fraction rich in oxygen and a fraction rich in nitrogen as products, comprising maintaining the purities of said product substantially constant during variations of the flow rate or of the pressure of the supply air by controlling the relative liquid to vapor interstage transfer rate within said distillation column in response to said variations of the flow rate or of the pressure of said supplied air, by increasing the relative liquid to vapor interstage transfer rate in said distillation column when the demand for the product or the flow rate of the supplied air increases, and decreasing the relative liquid to vapor interstage transfer rate in said distillation column when the demand for the product or the flow rate of the supplied air decreases by maintaining the liquid in the sump of the distillation column at a predetermined level by means of a sump level controller having a set point set at a predetermined level; and controlling said sump level solely in dependence on the flow rate of air to the column.

2. A process according to claim 1 wherein the distillation apparatus comprises a condenser in heat exchange relation with said sump liquid.

* * * * *